US011294023B2

(12) United States Patent
Cribbs, III et al.

(10) Patent No.: US 11,294,023 B2
(45) Date of Patent: Apr. 5, 2022

(54) TECHNIQUES FOR ASSOCIATING GEOLOCATION MEASUREMENTS IN ELECTRONIC INTELLIGENCE (ELINT) APPLICATIONS OR OTHER APPLICATIONS

(71) Applicant: Raytheon Company, Waltham, MA (US)

(72) Inventors: H. Brown Cribbs, III, Arlington, VA (US); Danielle J. Marchione, Vienna, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/016,584

(22) Filed: Sep. 10, 2020

(65) Prior Publication Data

US 2021/0149014 A1    May 20, 2021

Related U.S. Application Data

(60) Provisional application No. 62/937,589, filed on Nov. 19, 2019.

(51) Int. Cl.
  *G01S 5/06*  (2006.01)
  *G01S 5/02*  (2010.01)
  *H04W 4/029*  (2018.01)

(52) U.S. Cl.
  CPC .............. *G01S 5/06* (2013.01); *G01S 5/0246* (2020.05); *H04W 4/029* (2018.02)

(58) Field of Classification Search
  CPC ......... G01S 5/06; G01S 5/0246; H04W 4/029
  See application file for complete search history.

(56) References Cited

U.S. PATENT DOCUMENTS

| 11,022,670 B1* | 6/2021 | Giallorenzi | H04B 17/27 |
| 2008/0039039 A1* | 2/2008 | Chung | G01S 5/0226 |
| | | | 455/187.1 |
| 2009/0224957 A1* | 9/2009 | Chung | G01S 5/0268 |
| | | | 342/29 |

(Continued)

FOREIGN PATENT DOCUMENTS

WO    2014200584 A2    12/2014

OTHER PUBLICATIONS

Yatrakis, "Computing the Cross Ambiguity Function: A Review," Thesis, Binghamton University, State University of New York, 2005, 131 pages.

*Primary Examiner* — Ernest G Tacsik (57) ABSTRACT

A method includes obtaining multiple geolocation measurements, where each geolocation measurement is generated using cross-ambiguity function (CAF) detection. The geolocation measurements are associated with at least one signal from at least one signal source and received by multiple receivers. The method also includes associating related geolocation measurements to form at least one collection of related geolocation measurements, where each collection of related geolocation measurements is associated with a common one of the at least one signal received by at least some of the receivers. The method further includes performing geolocation using the at least one collection of related geolocation measurements to identify one or more geolocations of the at least one signal source.

20 Claims, 7 Drawing Sheets

(56) References Cited

U.S. PATENT DOCUMENTS

| | | | |
|---|---|---|---|
| 2012/0021687 A1* | 1/2012 | Parker | H01Q 3/2611 455/63.1 |
| 2015/0153436 A1* | 6/2015 | Benson | G01S 5/0221 701/3 |
| 2019/0011526 A1* | 1/2019 | Avitzour | G01S 5/04 |
| 2020/0386851 A1* | 12/2020 | Eakins | G01S 5/06 |

* cited by examiner

TECHNIQUES FOR ASSOCIATING GEOLOCATION MEASUREMENTS IN ELECTRONIC INTELLIGENCE (ELINT) APPLICATIONS OR OTHER APPLICATIONS

CROSS-REFERENCE TO RELATED APPLICATION AND PRIORITY CLAIM

This application claims priority under 35 U.S.C. § 119(e) to U.S. Provisional Patent Application No. 62/937,589 filed on Nov. 19, 2019, which is hereby incorporated by reference in its entirety.

TECHNICAL FIELD

This disclosure relates generally to geolocation systems. More specifically, this disclosure relates to techniques for associating geolocation measurements in electronic intelligence (ELINT) applications or other applications.

BACKGROUND

Signal intelligence (SIGINT) generally refers to intelligence-gathering operations that occur through the interception of electromagnetic signals or other signals. When involving communications between people, signal intelligence is often referred to as communication intelligence (COMINT). When involving electronic signals not directly used in communications between people, signal intelligence is often referred to as electronic intelligence (ELINT). One common function in ELINT applications and other applications is geolocation, which refers to the identification of a location on Earth from which electromagnetic signals or other signals are transmitted or otherwise originate.

SUMMARY

This disclosure provides techniques for associating geolocation measurements in electronic intelligence (ELINT) applications or other applications.

In a first embodiment, a method includes obtaining multiple geolocation measurements, where each geolocation measurement is generated using cross-ambiguity function (CAF) detection. The geolocation measurements are associated with at least one signal from at least one signal source and received by multiple receivers. The method also includes associating related geolocation measurements to form at least one collection of related geolocation measurements, where each collection of related geolocation measurements is associated with a common one of the at least one signal received by at least some of the receivers. The method further includes performing geolocation using the at least one collection of related geolocation measurements to identify one or more geolocations of the at least one signal source.

In a second embodiment, an apparatus includes at least one memory configured to store multiple geolocation measurements based on CAF detection. The geolocation measurements are associated with at least one signal from at least one signal source that is received by multiple receivers. The apparatus also includes at least one processing device configured to associate related geolocation measurements to form at least one collection of related geolocation measurements. Each collection of related geolocation measurements is associated with a common one of the at least one signal received by at least some of the receivers. The at least one processing device is also configured to perform geolocation using the at least one collection of related geolocation measurements to identify one or more geolocations of the at least one signal source.

In a third embodiment, a non-transitory computer readable medium contains instructions that when executed cause at least one processor to obtain multiple geolocation measurements based on CAF detection. The geolocation measurements are associated with at least one signal from at least one signal source that is received by multiple receivers. The medium also contains instructions that when executed cause the at least one processor to associate related geolocation measurements to form at least one collection of related geolocation measurements. Each collection of related geolocation measurements is associated with a common one of the at least one signal received by at least some of the receivers. The medium further contains instructions that when executed cause the at least one processor to perform geolocation using the at least one collection of related geolocation measurements to identify one or more geolocations of the at least one signal source.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, one common function in electronic intelligence (ELINT) applications and other applications is geolocation, which refers to the identification of a location on Earth from which electromagnetic signals or other signals are transmitted or otherwise originate. Often times, signals are sensed at multiple locations, and measurements of the signals are captured and processed. Among other things, pulses contained in the signals received at multiple locations need to be clustered together in order to perform geolocation. This is typically accomplished by detecting individual pulses in individual communication channels, performing fine characterizations of the pulses to identify features, and storing the features for later association. However, this is typically a complex data association process and can result in significant delays.

This disclosure provides techniques for associating geolocation measurements in ELINT applications or other applications. As described in more detail below, geolocation measurements such as time difference of arrival (TDOA) or frequency difference of arrival (FDOA) measurements are generated using cross-ambiguity function (CAF) detectors, and associations between the geolocation measurements are derived. The characteristics of the CAF detectors can be used as selectors for the associations, such as within a multi-dimensional (N-D) Gaussian neighborhood. This allows associations to be made between the geolocation measurements based on various factors, such as similarity in time, frequency, and/or pulse width. In addition, the associations can identify "triplets" of TDOA/FDOA measurements that sum to essentially zero (due to the geometric constraints for certain calculations), which can be done to confirm that geolocation measurements are properly associated with one another and belong together. Once associated, a group of associated geolocation measurements is assumed to come from the same emitter, and the group of associated geolocation measurements can be used to identify the geolocation of that emitter.

In this way, CAF detections themselves can be used with information such as estimated pulse widths and TDOA/FDOA measurements to allow for likely groupings of geolocation measurements. This helps to associate related geolocation measurements based on appropriate associations prior to location estimation, which is useful since location estimation assumes that all measurements in a group are from the same emitter. As a result, this helps to improve the speed and accuracy of geolocation operations.

Note that the term "signal" as used in this patent document generally refers to any electromagnetic, acoustic, seismic, or other signal that can be detected or sensed and measured. Electromagnetic signals represent propagating electromagnetic radiation and include radio waves, microwaves, infrared radiation, visible radiation, ultraviolet radiation, X-rays, and gamma rays. Acoustic signals represent any propagating sound waves, pressure waves, or vibrations in the air or through the water. Seismic signals represent any propagating signals through the ground. Also note that the terms "emitter" and "signal source" generally refer to any source of an electromagnetic, acoustic, seismic, or other signal that can be detected or sensed and measured. Various discussions below may routinely be expressed as occurring for ELINT applications in which (i) the signals are electromagnetic signals and (ii) the emitters or signal sources are electronic devices. However, the approaches described in this patent document can be used in any other suitable applications. These applications can include any suitable communication intelligence (COMINT), other signal intelligence (SIGINT), or measurement and signature intelligence (MASINT) applications.

Figure 1:
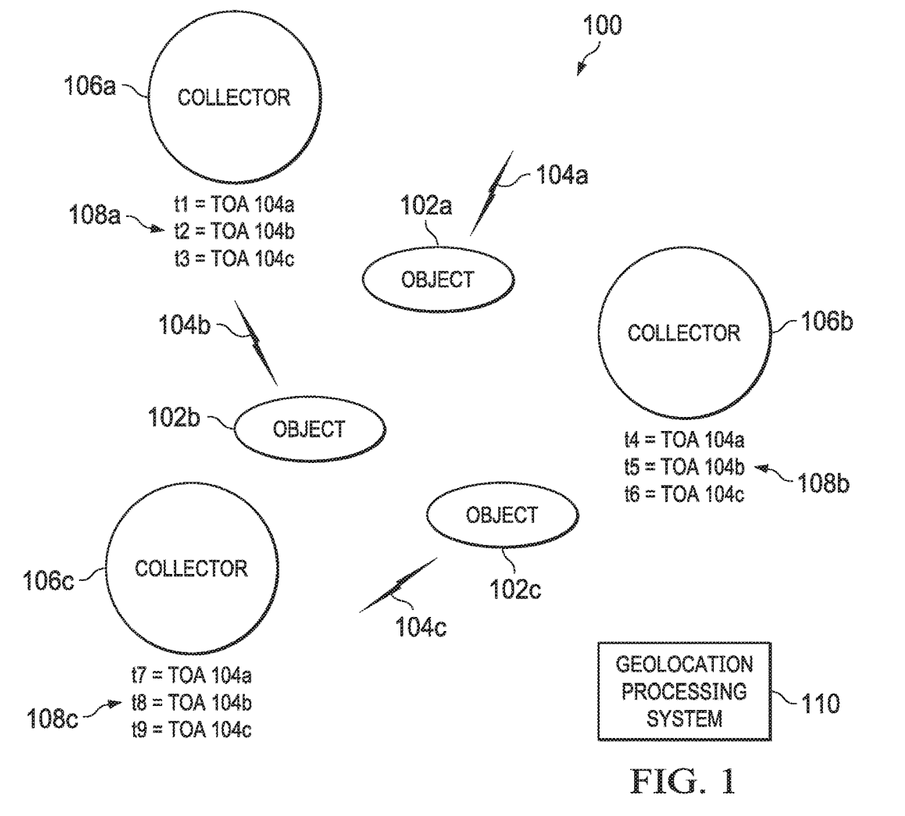
FIG. 1 illustrates an example system for associating geolocation measurements in electronic intelligence (ELINT) applications or other applications in accordance with this disclosure.

FIG. 1 illustrates an example system 100 for associating geolocation measurements in ELINT applications or other applications in accordance with this disclosure. As shown in FIG. 1, the system 100 includes one or more objects 102a-102c, each of which can include an emitter configured to transmit or cause the generation or transmission of one or more electromagnetic or other signals 104a-104c, respectively. Each object 102a-102c can be mobile or stationary, and each object 102a-102c may represent any suitable device or system that generates or causes the generation or transmission of at least one detectable signal 104a-104c. Example types of devices or systems that may be represented as the objects 102a-102c can include mobile telephones, satellite telephones, smartphones, one-way or two-way radios, tablet computers, laptop computers, or wireless beacons. Other example types of devices or systems that may be represented as the objects 102a-102c can include portable or fixed radar systems, artillery systems, nuclear devices (such as those that are detonated underground to avoid detection), or other explosive devices that are detonated. In some embodiments, at least two objects 102a-102c may communicate with each other, or all objects 102a-102c may be communicating with other devices or systems not represented as objects here.

The system 100 also includes at least three collectors 106a-106c, each of which collects information about the signals 104a-104c generated by or transmitted from the objects 102a-102c. For example, each collector 106a-106c may include one or more sensors or detectors that can receive the signals 104a-104c. As particular examples, at least one collector 106a-106c may include one or more receivers or wireless radios configured to receive electromagnetic signals. At least one collector 106a-106c may include one or more microphones, pressure sensors, or vibration sensors configured to receive acoustic signals. At least one collector 106a-106c may include one or more seismic sensors configured to receive seismic signals. Note that each collector 106a-106c may include any suitable type(s) of sensor(s) or other device(s) for measuring one or more types of signals. Also note that the collectors 106a-106c may, as a group, support any suitable type(s) of sensor(s) or other device(s) for measuring one or more types of signals.

Each collector 106a-106c also typically includes one or more processors that can process digitized forms of the signals 104a-104c and generate information about the signals 104a-104c. Example types of processors can include microprocessors, microcontrollers, digital signal processors (DSPs), application-specific integrated circuits (ASICs), field programmable gate arrays (FPGAs), and discrete circuitry. Each collector 106a-106c may include any suitable number(s) and type(s) of processors. In some embodiments, each collector 106a-106c may capture time of arrival (TOA) measurements 108a-108c, respectively. A time of arrival measurement 108a-108c identifies the time that a signal 104a-104c is received or sensed by the associated collector 106a-106c.

Each collector 106a-106c can be mobile or stationary. However, each collector 106a-106c typically has a location that is known with adequate accuracy when the time of arrival measurements 108a-108c are captured. This allows geolocations of the objects 102a-102c to be determined using the known locations of the collectors 106a-106c and the time of arrival measurements 108a-108c. Thus, each collector 106a-106c may include a Global Positioning System (GPS) receiver, other satellite-based navigation system, Ultra WideBand (UWB) receiver, or other navigation system or location determination system that allows the location of the collector 106a-106c to be determined with adequate accuracy.

The time of arrival measurements 108a-108c and possibly other data generated or otherwise obtained by the collectors 106a-106c are provided to a geolocation processing system 110, which processes the information to support geolocation of the objects 102a-102c. For example, the geolocation processing system 110 can generate signal observation records associated with different measurements of various signals 104a-104c from the collectors 106a-106c, or the geolocation processing system 110 may receive the signal observation records (such as from the collectors 106a-106c). The geolocation processing system 110 processes the signal observation records as described below to associate different signal observation records (and therefore to associate different signal measurements of the signals 104a-104c) with one another. Each group of associated signal observation records will ideally be associated with a single object 102a-102c, and the associated signal observation records can be further processed to support geolocation of the objects 102a-102c.

The geolocation processing system 110 can be implemented in any suitable manner, such as by using hardware or a combination of hardware and software/firmware instructions. In some embodiments, the geolocation processing system 110 may be cloud-based and can receive data from the collectors 106a-106c and other data sources and provide processing results to one or more destinations in any suitable manner. In other embodiments, the geolocation processing system 110 may be implemented using one or more servers or other computing devices that can receive data from the collectors 106a-106c and other data sources and provide processing results to one or more destinations in any suitable manner. In general, the computing or processing functionality of the geolocation processing system 110 can be implemented in a number of ways, and this disclosure is not limited to any specific physical implementation of the geolocation processing system 110.

Although FIG. 1 illustrates one example of a system 100 for associating geolocation measurements in ELINT applications or other applications, various changes may be made to FIG. 1. For example, the system 100 may include any suitable number of objects 102a-102c, and the system 100 may include more than three collectors 106a-106c. Also, the functionality of the geolocation processing system 110 may be implemented in any suitable location(s) of the system 100, whether centralized or distributed.

Figure 2:
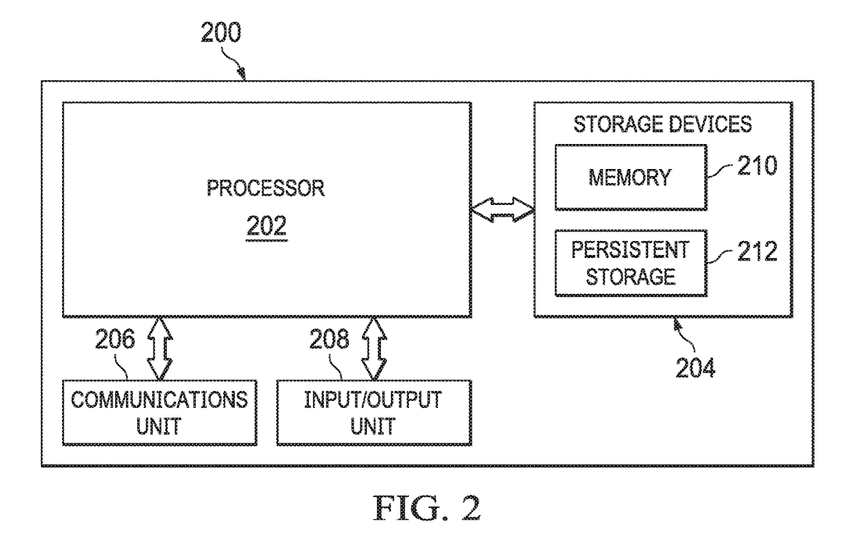
FIG. 2 illustrates an example device for associating geolocation measurements in ELINT applications or other applications in accordance with this disclosure.

FIG. 2 illustrates an example device 200 for associating geolocation measurements in ELINT applications or other applications in accordance with this disclosure. The device 200 (or multiple instances of the device 200) may be used to implement the functionality of the geolocation processing system 110 of FIG. 1. However, the geolocation processing system 110 may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that are loaded into a memory 210. The instructions can include instructions for aggregating and associating geolocation records to support geolocation operations. The processing device 202 includes any suitable number(s) and type(s) of processors or other devices in any suitable arrangement. Example types of processing devices 202 include microprocessors, microcontrollers, DSPs, ASICs, FPGAs, and discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include at least one network interface card or at least one wireless transceiver facilitating communications over one or more wired or wireless networks. Among other things, the communications unit 206 supports the receipt of data from the collectors 106a-106c and other data sources for processing. The data can be obtained via direct connections or indirectly, such as via one or more public or private networks. The communications unit 206 may also support the communication of analysis results from the geolocation processing system 110 to one or more destinations. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. As a particular example, the I/O unit 208 may be used to receive input data (such as user selections) for the geolocation processing system 110 and to provide output data (such as visualizations or other results from the geolocation processing system 110) to a display device for presentation. Note that if the geolocation processing system 110 is implemented in a cloud-based manner or in a distributed or remote manner, there may be little or no need for local I/O, and the I/O unit 208 may be omitted.

Although FIG. 2 illustrates one example of a device 200 for associating geolocation measurements in ELINT applications or other applications, various changes may be made to FIG. 2. For example, any other suitable hardware implementation or hardware and software/firmware implementation can be used to implement the functionality of the geolocation processing system 110. Also, computing devices and systems come in a wide variety of configurations, and FIG. 2 does not limit this disclosure to any particular computing device or system.

Figure 3:
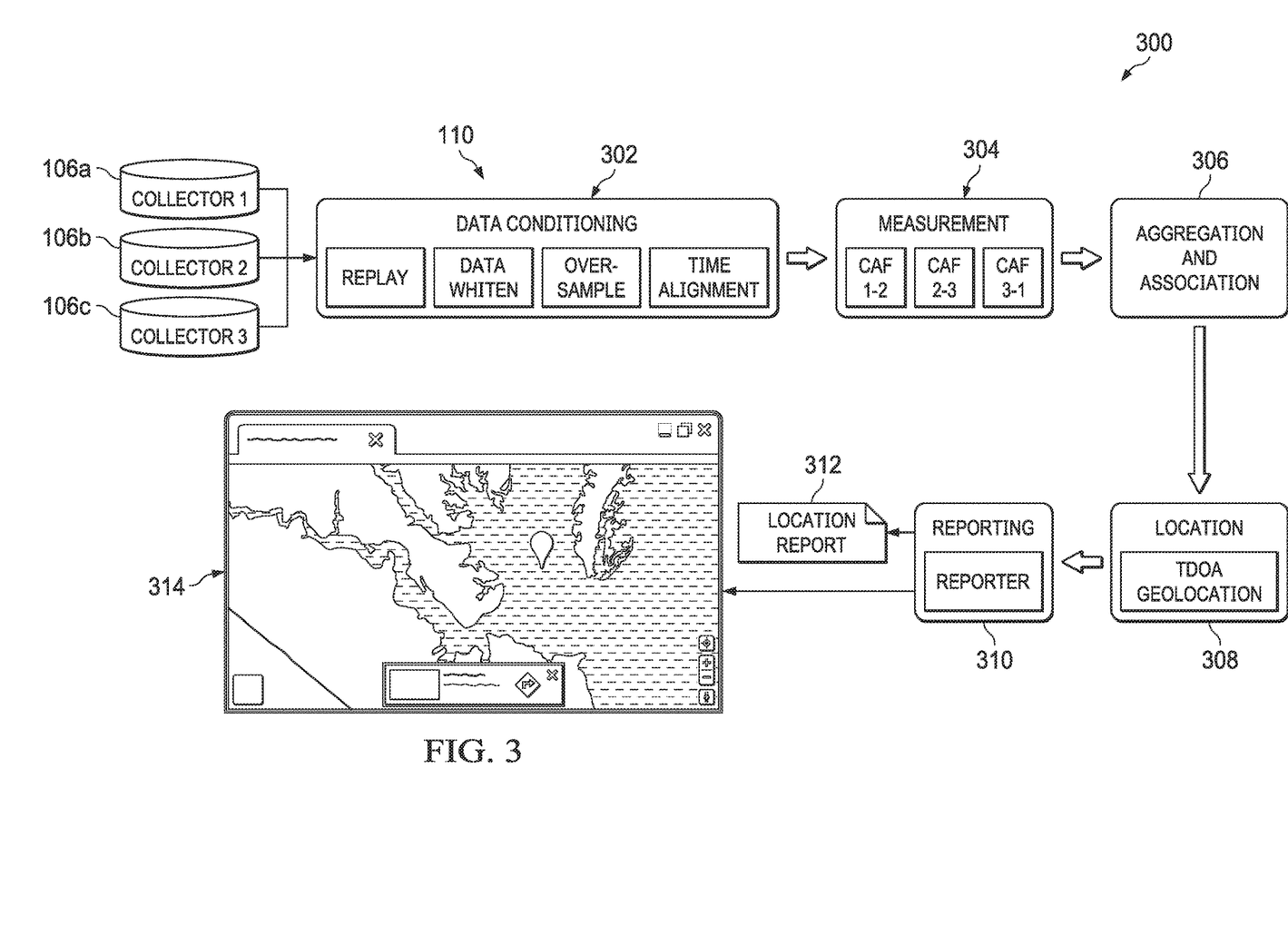
FIG. 3 illustrates an example architecture for associating geolocation measurements in ELINT applications or other applications in accordance with this disclosure.

FIG. 3 illustrates an example architecture 300 for associating geolocation measurements in ELINT applications or other applications in accordance with this disclosure. For ease of explanation, the architecture 300 shown in FIG. 3 may be described as being used in the geolocation processing system 110 of FIG. 1, which may be implemented using one or more devices 200 of FIG. 2. However, the architecture 300 shown in FIG. 3 may be implemented using any suitable device(s) in any suitable system(s).

As shown in FIG. 3, data from various collectors 106a-106c is provided to a data conditioning function 302 in the geolocation processing system 110. The data conditioning function 302 generally operates to pre-process the data from the collectors 106a-106c and prepare the data for further processing in the geolocation processing system 110. Various types of pre-processing operations may occur here. For example, the data from the collectors 106a-106c may be stored, and a replay function may be used to replay or rerun the data through the data conditioning function 302 and other functions as needed. A data whitening function may be used to remove underlying correlated noise in the data from the collectors 106a-106c. An over-sampling function may be used to generate additional data based on the data from the collectors 106a-106c. A time alignment function is used to align the data from the collectors 106a-106c in time so that data from different collectors 106a-106c can be cross-correlated and more closely grouped.

The pre-processed data from the data conditioning function 302 is provided to a measurement function 304, which processes the data to generate geolocation measurements associated with the signals 104a-104c received by the collectors 106a-106c. For example, the measurement function 304 can use multiple cross-ambiguity function (CAF) detectors to generate TDOA and/or FDOA measurements based on the data provided by the collectors 106a-106c. In this example, each CAF detector processes data from a pair of the collectors 106a-106c and generates TDOA/FDOA measurements associated with that specific pair of collectors 106a-106c. For instance, "CAF 1-2" in FIG. 3 represents the CAF detector that processes data from the collectors 106a-106b, "CAF 2-3" in FIG. 3 represents the CAF detector that processes data from the collectors 106b-106c, and "CAF 3-1" in FIG. 3 represents the CAF detector that processes data from the collectors 106c and 106a.

Each CAF detector can process blocks of data from two of the collectors 106a-106c to compute TDOA and/or FDOA measurements. A TDOA measurement generally represents the time difference between receipt of a pulse at one collector in a pair and receipt of a pulse at the other collector in the pair. An FDOA measurement generally represents the frequency difference between the frequency of a signal received at one collector in a pair and the frequency of a signal received at the other collector in the pair. Because it is possible for a signal to arrive earlier or later at one collector relative to the other collector in each pair, TDOA measurements may be positive or negative. Similarly, because it is possible for a signal frequency to be higher or lower at one collector relative to the other collector in each pair due to differing Doppler shifts, FDOA measurements may be positive or negative. Each CAF detector in the measurement function 304 may use any suitable implementation of a cross-ambiguity function to identify the TDOA/FDOA measurements. Each CAF detector can also generate additional measurements, such as measurements of detection amplitudes, detection noise estimates, and coarse pulse widths.

The geolocation measurements from the measurement function 304 are provided to an aggregation and association function 306. As described in more detail below, the aggregation and association function 306 generally operates to group associated geolocation measurements, such as associated TDOA and/or FDOA measurements, into related sets. Effectively, the aggregation and association function 306 attempts to split the geolocation measurements so that measurements associated with the same signal 104a-104c are grouped together. Ideally, this allows grouped measurements associated with the same signal 104a-104c to be used for geolocation of the object 102a-102c that generated or transmitted the signal. Example processes performed as part of the aggregation and association function 306 are provided below. The outputs of the aggregation and association function 306 include associated groups of geolocation measurements. Ideally, each group of geolocation measurements includes geolocation data for one object 102a-102c that generated or transmitted an associated signal 104a-104c.

A location function 308 uses the outputs of the aggregation and association function 306 to identify geolocations for one or more objects 102a-102c. For example, the location function 308 may use multilateration based on different TDOA/FDOA measurements in a group of geolocation measurements (which are ideally based on measurements of the same signal 104a-104c captured by different collectors 106a-106c) to estimate the geolocation of the object that generated or transmitted the signal. Note that the location function 308 may use any other suitable techniques to process geolocation measurements and identify geolocations of objects.

A reporting function 310 may use the identified geolocations of the objects 102a-102c to generate output for one or more users or to perform any other suitable function. For example, the reporting function 310 may generate a report 312 containing at least one location of at least one object 102a-102c as determined by the location function 308. As another example, the reporting function 310 may generate a graphical user interface or other graphical display 314 identifying at least one location of at least one object 102a-102c as determined by the location function 308. Note, however, that locations of objects as determined by the location function 308 may be used in other ways without departing from the scope of this disclosure.

The various functions 302-310 shown in FIG. 3 may be implemented in any suitable manner. For example, in some embodiments, the functions 302-310 shown in FIG. 3 can be implemented or supported using one or more software applications or other software instructions that are executed by one or more processing devices 202 of at least one device 200. In other embodiments, at least some of the functions 302-310 shown in FIG. 3 can be implemented or supported using dedicated hardware components. In general, the functions 302-310 shown in FIG. 3 can be implemented or performed using any suitable hardware or any suitable combination of hardware and software/firmware instructions.

Although FIG. 3 illustrates one example of an architecture 300 for associating geolocation measurements in ELINT applications or other applications, various changes may be made to FIG. 3. For example, various functions in FIG. 3 can be added, omitted, combined, further subdivided, replicated, or placed in any other suitable configuration according to particular needs.

Figure 4:
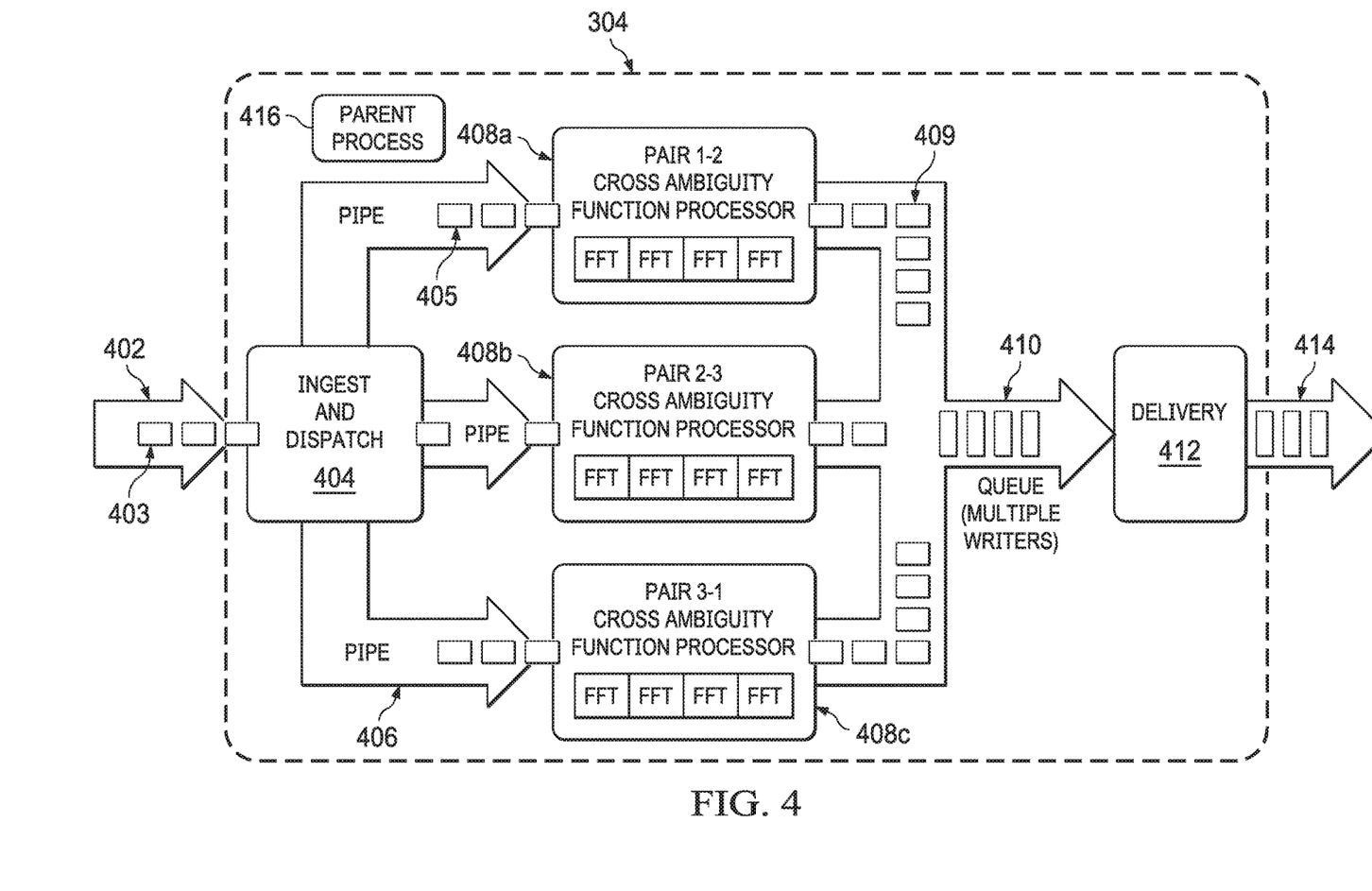
FIG. 4 illustrates an example process for generating geolocation measurements in ELINT applications or other applications in accordance with this disclosure.

FIG. 4 illustrates an example process 400 for generating geolocation measurements in ELINT applications or other applications in accordance with this disclosure. In particular, the process 400 shown in FIG. 4 may be performed as part or all of the measurement function 304 shown in FIG. 3. For ease of explanation, the process 400 shown in FIG. 4 may be described as being used in the geolocation processing system 110 of FIG. 1, which may be implemented using one or more devices 200 of FIG. 2. However, the process 400 shown in FIG. 4 may be implemented using any suitable device(s) in any suitable system(s).

As shown in FIG. 4, the process 400 receives input data 402 that includes various measurements 403 captured or otherwise generated by the collectors 106a-106c and pre-processed by the data conditioning function 302. Thus, the measurements 403 here are time-aligned and can be placed in a desired format by the data conditioning function 302. The measurements 403 can include various information, such as times of arrivals of the various signals 104a-104c at the collectors 106a-106c. The measurements 403 may also include other information about the signals 104a-104c, such as pulse widths, frequencies, or other data about the signals 104a-104c derived by the collectors 106a-106c.

An ingest and dispatch function 404 initially analyzes the measurements 403 and determines where to route the measurements 403. For example, the ingest and dispatch function 404 may deserialize data or otherwise prepare the data for processing within the measurement function 304. Also, as noted above, data from pairs of collectors may be analyzed, and the ingest and dispatch function 404 can provide copies of the measurements 403 (referred to input data 405) to different analysis functions according to the pairings.

The input data 405 is transported via multiple pipes 406 to different CAF processing functions 408a-408c. As described above, different CAF detectors can be used to process data from different pairs of collectors 106a-106c, and the CAF processing functions 408a-408c implement the CAF detectors. In this particular example, each CAF processing function 408a-408c may be implemented using or may include multiple fast Fourier transform (FFT) processes or threads, which support parallel processing of data in the CAF processing functions 408a-408c (although this is not necessarily required). The outputs of the CAF processing functions 408a-408c include geolocation measurements 409, such as TDOA/FDOA measurements. The CAF processing functions 408a-408c can also generate additional measurements as part of or associated with the geolocation measurements 409, such as measurements of detection amplitudes, detection noise estimates, and coarse pulse widths. For instance, each of the CAF processing functions 408a-408c can perform noise level estimation, detection by statistical threshold, and subsequent coarse pulse-width estimation operations.

The geolocation measurements 409 are provided to a queue 410, which stores the geolocation measurements 409 until retrieved by a delivery function 412. The delivery function 412 can output the geolocation measurements 409 as at least part of output data 414 from the measurement function 304. In some embodiments, the delivery function 412 may support on-demand or batch delivery of the geolocation measurements 409. Also, the delivery function 412 may format the geolocation measurements 409 in any desired manner.

A parent process 416 controls the overall operation of the measurement function 304. For example, the parent process 416 can control how the ingest and dispatch function 404 routes the measurements 403 to the CAF processing functions 408a-408c, how the CAF processing functions 408a-408c process the input data 405, and how the delivery function 412 outputs the geolocation measurements 409.

Although FIG. 4 illustrates one example of a process 400 for generating geolocation measurements in ELINT applications or other applications, various changes may be made to FIG. 4. For example, the specific implementation of the process 400 shown here is for illustration only. Any other suitable approaches may use CAF detectors or processors to generate geolocation measurements that are to be aggregated and associated as described below. This disclosure is not limited to any particular implementation of the CAF detectors or processors.

Figure 5:
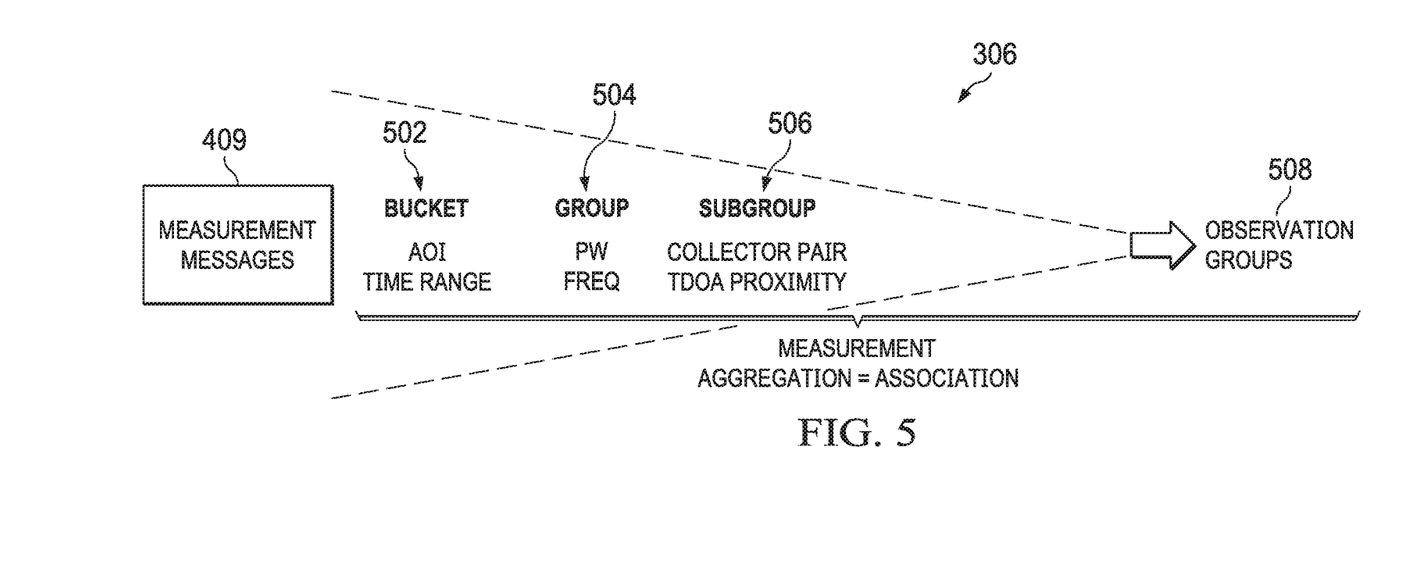
FIGS. 5 and 6 illustrate an example process for aggregating and associating geolocation measurements in ELINT applications or other applications in accordance with this disclosure.
Figure 6:
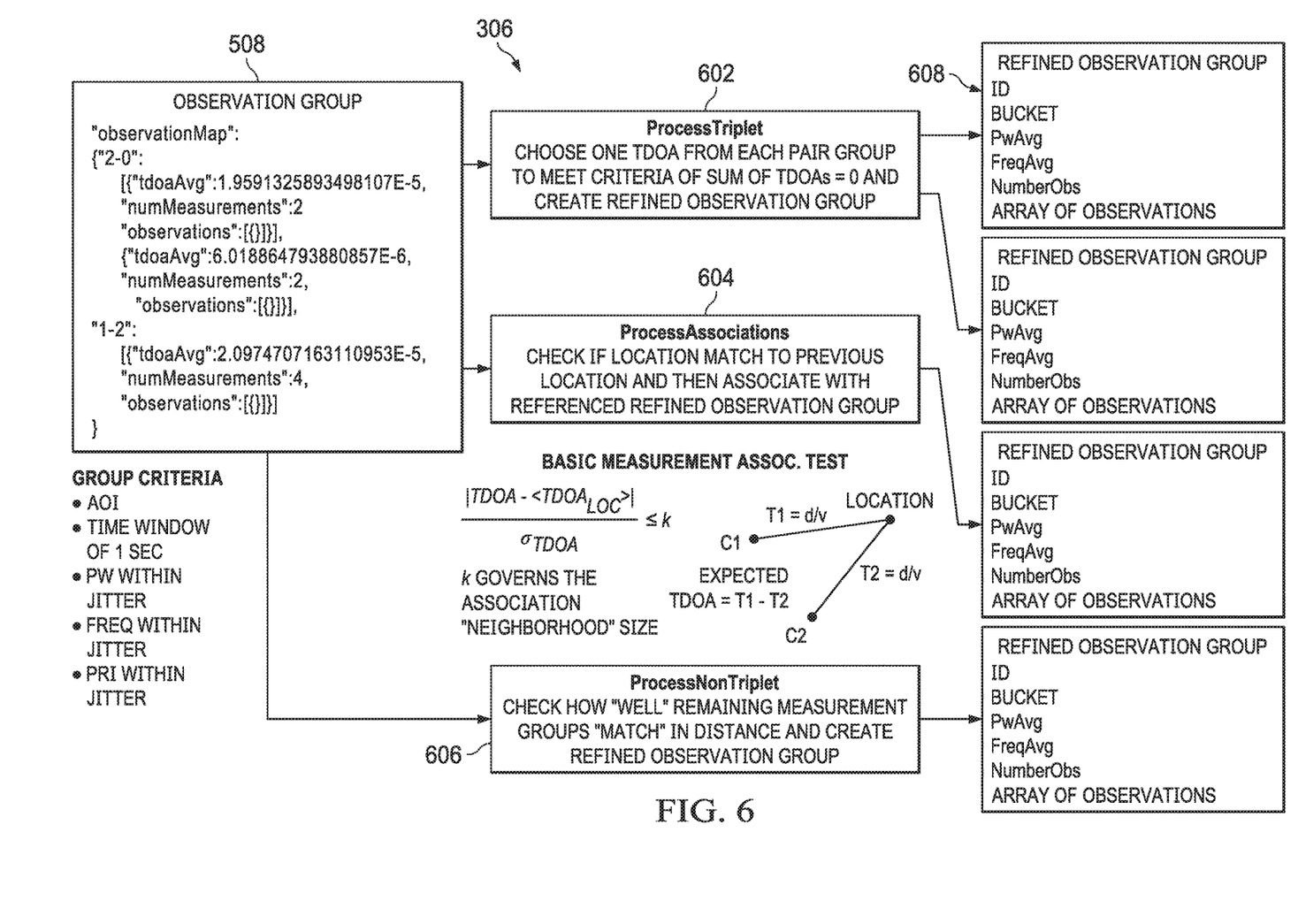

FIGS. 5 and 6 illustrate an example process 500 for aggregating and associating geolocation measurements in ELINT applications or other applications in accordance with this disclosure. In particular, the process 500 shown in FIGS. 5 and 6 may be performed as part of the aggregation and association function 306 shown in FIG. 3. For ease of explanation, the process 500 shown in FIGS. 5 and 6 may be described as being used in the geolocation processing system 110 of FIG. 1, which may be implemented using one or more devices 200 of FIG. 2. However, the process 500 shown in FIGS. 5 and 6 may be implemented using any suitable device(s) in any suitable system(s).

As shown in FIG. 5, the process 500 receives geolocation measurements 409, such as TDOA/FDOA measurements, from the measurement function 304. The geolocation measurements 409 may be provided to the aggregation and association function 306 in any suitable manner, such as continuously, on-demand, or in batches. The process 500 aggregates the geolocation measurements 409 in order to create associations between related geolocation measurements 409, such as geolocation measurements 409 associated with the same signal 104a-104c sensed by different collectors 106a-106c.

In this example embodiment, the aggregation and association function 306 uses a layered or hierarchical approach to aggregating the geolocation measurements 409. In this particular example, the aggregation and association function 306 may first group geolocation measurements 409 into buckets 502. Each bucket 502 contains geolocation measurements 409 that have matching areas of interest (AOIs) and time ranges. In some embodiments, each area of interest identifies a specific geographical or physical area from which signals may be sensed. Also, in some embodiments, measurements 409 can be grouped if they are captured within a specified amount of time of one another, such as within one second.

The aggregation and association function 306 may next combine measurements 409 within the buckets 502 into groups 504. Each group 504 contains measurements 409 from a single bucket 502 that have matching or substantially similar pulse widths and frequencies. For instance, the measurements 409 in each group 504 may represent the measurements 409 from a single bucket 502 that have pulse widths within some threshold amount of each other and frequencies within some threshold amount of each other. The thresholds used here can account for uncertainties in signal reception and processing, such as jitter that arises from manufacturing processes associated with the emitter objects 102a-102c or associated with the sensors or other components of the collectors 106a-106c.

The aggregation and association function 306 may then combine measurements 409 from the groups 504 into subgroups 506. Each subgroup 506 contains measurements 409 from a single group 504, and the measurements 409 in each subgroup 506 are associated with the same pair of collectors 106a-106c and have matching or substantially similar TDOA/FDOA measurements that are within some threshold amount of each other. Again, the threshold used here can account for uncertainties in signal reception and processing, such as jitter.

The results of the layered aggregation scheme shown in FIG. 5 are observation groups 508, which generally represent groups of measurements 409 that may (or may not) be related to one another. In this example, each observation group 508 may contain measurements 409 that have the same or similar area of interest (AOI), time window, pulse width (PW), frequency, or other features that are the same or similar. Other example features that can be considered here include pulse repetition interval (PRI) or pulse repetition rate (PRR), antenna rotation rate, antenna pattern, antenna polarization, antenna power, pulse shape, or any combination thereof.

It should be noted here that the characteristics used to combine the measurements 409 into the buckets 502, groups 504, and subgroups 506 can vary as needed or desired. For example, specific examples are described above, and additional characteristics are described below with respect to FIG. 6. However, any other or additional characteristics may be used to form collections of measurements 409.

As shown in FIG. 6, the observation groups 508 are processed by the aggregation and association function 306 to identify specific associations between specific measurements 409 in the observation groups 508. In this particular example, a triplet processing function 602 attempts to identify triplets of measurements 409 in the observation groups 508 that satisfy specific criteria. Here, one criterion is that a triplet of measurements 409 includes a single measurement 409 associated with each of the different pairs of collectors 106a-106c. Based on the example shown in FIG. 1, each triplet of measurements 409 would include a single measurement 409 associated with the collectors 106a-106b, a single measurement 409 associated with the collectors 106b-106c, and a single measurement 409 associated with the collectors 106c and 106c. Another criterion is that the sum of the TDOA/FDOA values in a triplet of measurements 409 equals zero or substantially zero. Due to the mathematics of calculating the TDOA/FDOA values, the TDOA/FDOA values associated with three collectors 106a-106c that receive the same signal 104a-104c should be zero. Thus, a triplet of measurements 409 having TDOA/FDOA values that sum to zero or substantially zero are likely all associated with the same signal 104a-104c. Each triplet of measurements 409 satisfying these criteria may be used to define or update a refined observation group 608, which includes the triplet of measurements 409 and any associated data. The refined observation group 608 therefore represents a collection of associated measurements 409.

An associations processing function 604 can analyze remaining measurements 409 in the observation groups 508 (which were not added to any refined observation groups 608 by the function 602) to determine if any TDOA/FDOA values of the measurements 409 may be associated with known prior locations of one or more objects 102a-102c. For example, TDOA/FDOA values of new measurements 409 may be close enough to TDOA/FDOA values of prior measurements 409 that were previously used to identify a geolocation of an object, so the new measurements 409 may be associated with each other and/or with the prior measurements 409. In some embodiments, this can be expressed as:

$$\frac{|TDOA - TDOA_{LOC}|}{\sigma_{TDOA}} < k$$

Here, TDOA represents the TDOA value of a new measurement 409, and $TDOA_{LOC}$ represents the expected TDOA value of an emitter at a previously-determined geolocation (based on the collector's geometry). Also, $\sigma_{TDOA}$ represents the standard deviation of the prior measurements 409 associated with a previously-determined geolocation, and k denotes a threshold value. The size of k essentially governs the size of the "neighborhood" around a previously-determined geolocation. Any new measurements 409 within the threshold amount of a prior geolocation can be used to define or update a refined observation group 608.

A non-triplet processing function 606 attempts to identify if any remaining measurements 409 (which were not added to any refined observation groups 608 by the functions 602 and 604) in the observation groups 508 match each other adequately to be combined with one another. In that case, one or more refined observation groups 608 can be defined or updated using those measurements 409. This may take various forms and can vary depending on the implementation. For example, the non-triplet processing function 606 may attempt to determine if measurements 409 associated with two collectors 106a-106c are related (even if the third collector did not generate a corresponding measurement 409), which may be based on similarity of time of arrival and pulse width or based on a distance function.

Figure 7:
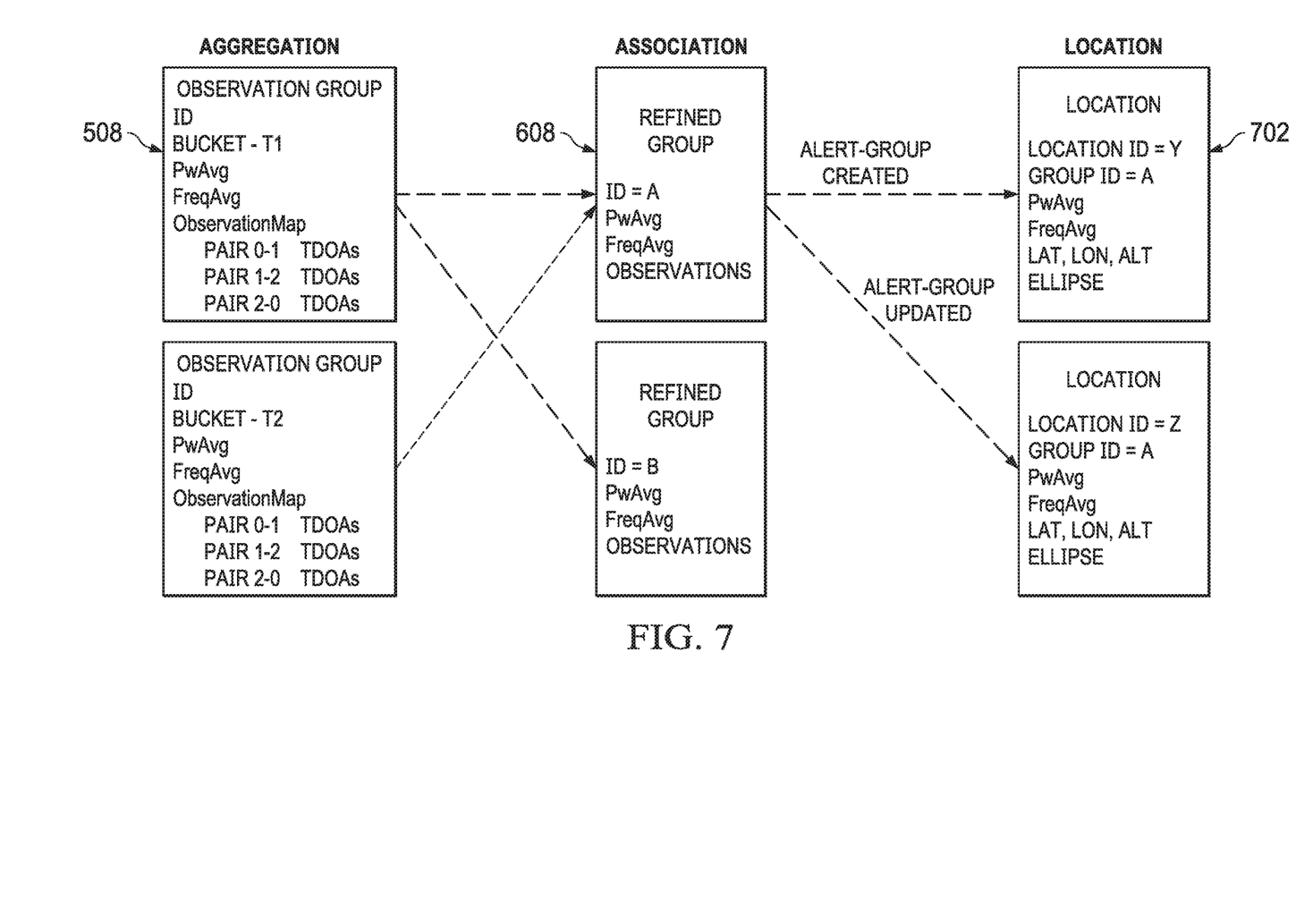
FIG. 7 illustrates an example aggregation and association of geolocation measurements in ELINT applications or other applications in accordance with this disclosure.

In this way, the aggregation and association function 306 can identify associations between geolocation measurements 409 and group the geolocation measurements 409 appropriately. The location function 308 may then process the grouped geolocation measurements 409, such as by processing the refined observation groups 608, to identify geolocations of objects 102a-102c. FIG. 7 illustrates an example aggregation and association of geolocation measurements in ELINT applications or other applications in accordance with this disclosure. As shown here, the observation groups 508 can be used to generate the refined observation groups 608, and the refined observation groups 608 can be processed by the location function 308 to produce location records 702. Each location record 702 may identify various information about an object 102a-102c, including at least an estimated location of the object. In some embodiments, the location record 702 for a particular object can be updated over time as the object's position changes based on new measurements 409.

In some embodiments as shown here, alerts can be generated by the aggregation and association function 306 to inform the location function 308 when one or more refined observation groups 608 are defined or updated. This allows the location function 308 to newly identify the location of one or more objects 102a-102c and/or to update the location of one or more objects 102a-102c based on the defined or updated refined observation groups 608. Note, however, that the location function 308 may operate in any other suitable manner to identify geolocations based on refined observation groups 608.

Although FIGS. 5 and 6 illustrate one example of a process 500 for aggregating and associating geolocation measurements in ELINT applications or other applications, various changes may be made to FIGS. 5 and 6. For example, the specific implementation of the process 500 shown here is for illustration only. Any other suitable approaches may be used to aggregate geolocation measurements, such as into different groupings. Also, additional processing techniques may be used to produce the refined observation groups 608. In addition, the processes 602-606 need not be performed in a specific order and can depart from the order described above. Although FIG. 7 illustrates one example of the aggregation and association of geolocation measurements in ELINT applications or other applications, various changes may be made to FIG. 7. For instance, the specific groups and records shown here are for illustration only.

As shown above, CAF-derived characteristics can be used in addition to geolocation measurements and provide a basis for association of the geolocation measurements. For example, CAF detectors can be used to provide detection with characteristics such as time and pulse width as useful estimates. The association works on multi-dimensional Gaussian neighborhoods forming localized clusters, such as based on time, pulse width, frequency, pulse repetition frequency, or other factors, to provide multi-dimensional clustering. The association process also uses multiple levels of refinement for grouping.

It should be noted that while the above description often assumes three collectors 106a-106c are used and three measurements 409 associated with three different pairs of collectors are identified and used, this is for illustration only. In other embodiments, more than three collectors may be used, and other numbers of measurements 409 associated with those collectors may be identified and used for geolocation.

Figure 8:
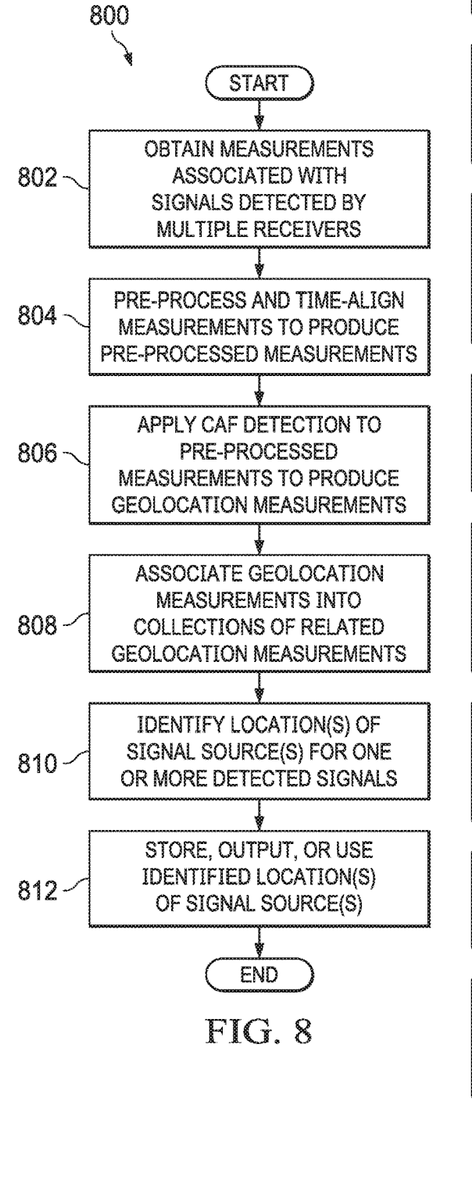
FIG. 8 illustrates an example method for associating geolocation measurements in ELINT applications or other applications in accordance with this disclosure.

FIG. 8 illustrates an example method 800 for associating geolocation measurements in ELINT applications or other applications in accordance with this disclosure. For ease of explanation, the method 800 shown in FIG. 8 may be described as being at least partially performed by the geolocation processing system 110 of FIG. 1, which may be implemented using one or more devices 200 of FIG. 2. However, the method 800 shown in FIG. 8 may be performed using any suitable device(s) in any suitable system(s).

As shown in FIG. 8, measurements associated with signals detected by multiple receivers are obtained at step 802. This may include, for example, the geolocation processing system 110 receiving measurements of electromagnetic, acoustic, seismic, or other signals 104a-104c from various collectors 106a-106c. The measurements are pre-processed and time-aligned to produce pre-processed measurements at step 804. This may include, for example, the geolocation processing system 110 performing the data conditioning function 302 to remove noise, generate over-sampled data, or otherwise pre-process the data. This may also include the geolocation processing system 110 performing the data conditioning function 302 to align the measurements from the collectors 106a-106c in time.

CAF detection is performed using the pre-processed measurements to produce geolocation measurements at step 806. This may include, for example, the geolocation processing system 110 performing the measurement function 304 to apply CAF detection and analyze the pre-processed measurements. In some embodiments, the measurement function 304 uses different CAF processing functions 408a-408c to process measurements from different pairs of the collectors 106a-106c. The results of the CAF detection include geolocation measurements that are associated with at least one signal 104a-104c from at least one object 102a-102c or other signal source.

The geolocation measurements are associated with each other into collections of related geolocation measurements at step 808. This may include, for example, the geolocation processing system 110 performing the aggregation and association function 306 to form at least one collection of related geolocation measurements, where each collection of related geolocation measurements is associated with a common signal 104a-104c received by at least some of the collectors 106a-106c. Example operations that may occur during step 810 in some embodiments are described below.

Geolocation is performed using one or more collections of related geolocation measurements to identify one or more geolocations of at least one signal source at step 810. This may include, for example, the geolocation processing system 110 performing the location function 308 to identify one or more geolocations for one or more objects 102a-102c or other signal sources, such as by using multilateration or other suitable technique. The identified location(s) of the signal source(s) can be used in any suitable manner. For example, the identified location(s) of the signal source(s) may be stored, output, or used at step 812. This may include, for example, the geolocation processing system 110 performing the reporting function 310 to generate a report 312 or graphical display 314 that includes at least one identified location of at least one object 102a-102c or other signal source.

Although FIG. 8 illustrates one example of a method 800 for associating geolocation measurements in ELINT applications or other applications, various changes may be made to FIG. 8. For example, while shown as a series of steps, various steps in FIG. 8 may overlap, occur in parallel, occur in a different order, or occur any number of times.

Figure 9:
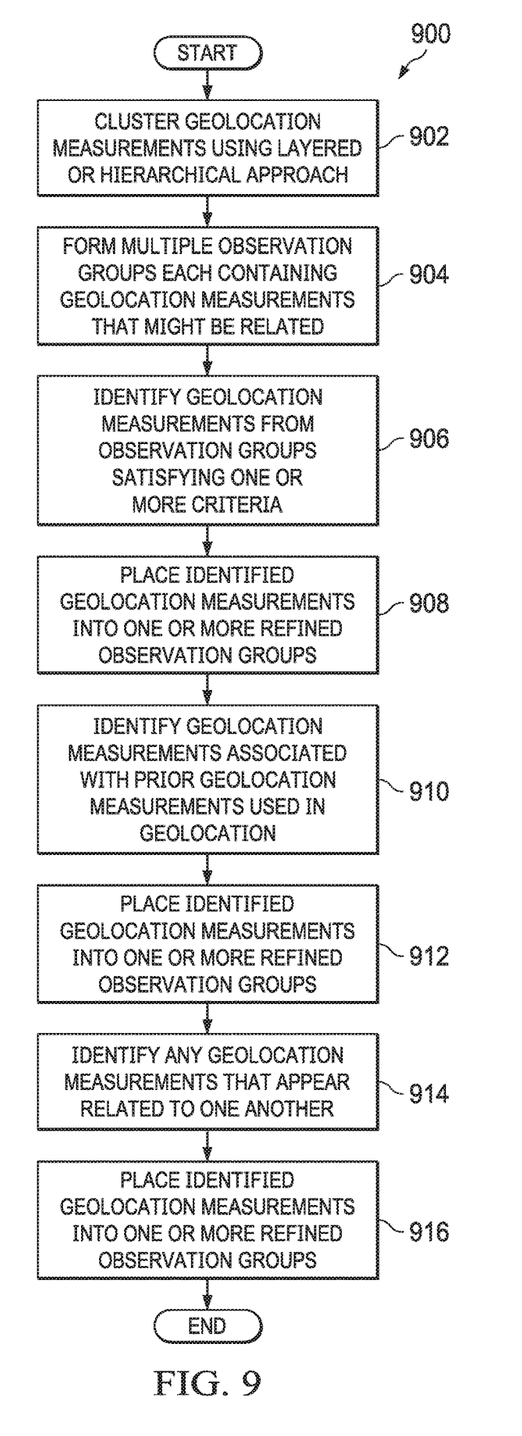
FIG. 9 illustrates an example method for grouping geolocation measurements into collections of related geolocation measurements in ELINT applications or other applications in accordance with this disclosure.

FIG. 9 illustrates an example method 900 for grouping geolocation measurements into collections of related geolocation measurements in ELINT applications or other applications in accordance with this disclosure. The method 900 shown in FIG. 9 may, for example, be performed as part of or during step 808 in the method 800 of FIG. 8. For ease of explanation, the method 900 shown in FIG. 9 may be described as being at least partially performed by the geolocation processing system 110 of FIG. 1, which may be implemented using one or more devices 200 of FIG. 2. However, the method 900 shown in FIG. 9 may be performed using any suitable device(s) in any suitable system(s).

As shown in FIG. 9, geolocation measurements are clustered, such as by using a layered or hierarchical approach, at step 902. This may include, for example, the aggregation and association function 306 placing the geolocation measurements into different buckets 502. The geolocation measurements in each bucket 502 may be associated with a common area of interest and based on signal receipt within a specified time window (such as within one second). This may also include the aggregation and association function 306 placing the geolocation measurements from the buckets 502 into different groups 504, where each group 504 contains geolocation measurements from the same bucket 502. The geolocation measurements in each group 504 may be associated with an approximately equal pulse width and an approximately equal frequency. This may also further the aggregation and association function 306 placing the geolocation measurements from the groups 504 into different subgroups 506, where each subgroup 506 contains geolocation measurements from the same group 504. The geolocation measurements in each subgroup 506 may be associated with a common pair of collectors 106a-106c and may be associated with approximately equal TDOA or FDOA measurements. Note, however, that other layered or hierarchical approaches may be used here. Other or additional signal characteristics may be used here to perform the clustering.

Multiple observation groups are formed, where each observation group includes multiple geolocation measurements that might be related, at step 904. This may include, for example, the aggregation and association function 306 grouping the geolocation measurements from the subgroups 506 into observation groups 508. In some embodiments, each observation group 508 may contain measurements that have the same or similar area of interest, time window, pulse width, frequency, pulse repetition interval, pulse repetition rate, antenna rotation rate, antenna pattern, antenna polarization, antenna power, pulse shape, or any combination thereof. Other or additional signal characteristics may be used here to form the observation groups.

Any geolocation measurements that satisfy one or more specified criteria are identified at step 906 and placed into one or more refined observation groups at step 908. This may include, for example, the aggregation and association function 306 applying one or more criteria to the geolocation measurements in each observation group 508 and identifying any geolocation measurements from the observation groups 508 that satisfy the one or more criteria. This may also include the aggregation and association function 306 placing the geolocation measurements that satisfy the one or more criteria into one or more refined observation groups 608, where each refined observation group 608 contains a collection of related geolocation measurements. In some embodiments, the one or more criteria may include a criterion that each collection of related geolocation measurements includes one geolocation measurement from each of multiple distinct pairs of collectors 106a-106c. Also, in some embodiments, the one or more criteria may include a criterion that each collection of related geolocation measurements has TDOA or FDOA measurements that sum to a value within a threshold amount of zero.

Any geolocation measurements that are associated with prior geolocation measurements used for geolocation are identified at step 910 and placed into one or more refined observation groups at step 912. This may include, for example, the aggregation and association function 306 identifying any geolocation measurements from the observation groups 508 that are in the neighborhood of or otherwise associated with prior geolocation measurements that were previously used to determine at least one geolocation of at least one object 102a-102c or other signal source. This may also include the aggregation and association function 306 placing the geolocation measurements associated with the prior geolocation measurements into one or more refined observation groups 608, where each refined observation group 608 contains a collection of related geolocation measurements.

Any geolocation measurements that otherwise appear related to one another are identified at step 914 and placed into one or more refined observation groups at step 916. This may include, for example, the aggregation and association function 306 identifying any geolocation measurements from the observation groups 508 that are from less than three collectors 106a-106c but still appear related (such as based on similarity of time of arrival and pulse width or based on a distance function). This may also include the aggregation and association function 306 placing the related geolocation measurements into one or more refined observation groups 608, where each refined observation group 608 contains a collection of related geolocation measurements.

Although FIG. 9 illustrates one example of a method 900 for grouping geolocation measurements into collections of related geolocation measurements in ELINT applications or other applications, various changes may be made to FIG. 9. For example, while shown as a series of steps, various steps in FIG. 9 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining multiple geolocation measurements, each geolocation measurement generated using cross-ambiguity function (CAF) detection, the geolocation measurements associated with at least one signal from at least one signal source and received by multiple receivers;
   associating related geolocation measurements to form at least one collection of related geolocation measurements, each collection of related geolocation measurements associated with a common one of the at least one signal received by at least some of the receivers; and
   performing geolocation using the at least one collection of related geolocation measurements to identify one or more geolocations of the at least one signal source;

wherein associating the related geolocation measurements comprises:
  placing the geolocation measurements into different buckets, the geolocation measurements in each bucket associated with a common area of interest and based on signal receipt within a specified time window;
  placing the geolocation measurements from the buckets into different groups, each group containing geolocation measurements from the same bucket, the geolocation measurements in each group associated with an approximately equal pulse width and an approximately equal frequency; and
  placing the geolocation measurements from the groups into different subgroups, each subgroup containing geolocation measurements from the same group, the geolocation measurements in each subgroup associated with a common pair of receivers and associated with approximately equal time difference of arrival (TDOA) or frequency difference of arrival (FDOA) measurements.

2. The method of claim 1, further comprising at least one of:
  generating a graphical display based on at least one of the one or more geolocations; and
  generating a report containing at least one of the one or more geolocations.

3. The method of claim 1, wherein associating the related geolocation measurements further comprises forming multiple observation groups, each observation group containing geolocation measurements that might be related to one another.

4. The method of claim 3, wherein associating the related geolocation measurements further comprises:
  identifying geolocation measurements from the observation groups satisfying one or more criteria; and
  placing the identified geolocation measurements into one or more refined observation groups, each refined observation group containing a collection of related geolocation measurements.

5. The method of claim 4, wherein the one or more criteria include at least one of:
  a criterion that each collection of related geolocation measurements includes one geolocation measurement from each of multiple distinct pairs of receivers; and
  a criterion that each collection of related geolocation measurements has TDOA or FDOA measurements that sum to a value within a threshold amount of zero.

6. The method of claim 4, wherein associating the related geolocation measurements further comprises:
  identifying geolocation measurements from the observation groups that are associated with prior geolocation measurements previously used to determine at least one prior geolocation; and
  placing the identified geolocation measurements into one or more additional refined observation groups.

7. The method of claim 6, wherein associating the related geolocation measurements further comprises:
  identifying remaining geolocation measurements from the observation groups that do not satisfy the one or more criteria and that are not associated with the prior geolocation measurements; and
  determining whether any of the remaining geolocation measurements are related to one another.

8. An apparatus comprising:
  at least one memory configured to store multiple geolocation measurements based on cross-ambiguity function (CAF) detection, the geolocation measurements associated with at least one signal from at least one signal source that is received by multiple receivers; and
  at least one processing device configured to:
    associate related geolocation measurements to form at least one collection of related geolocation measurements, each collection of related geolocation measurements associated with a common one of the at least one signal received by at least some of the receivers; and
    perform geolocation using the at least one collection of related geolocation measurements to identify one or more geolocations of the at least one signal source;
  wherein, to associate the related geolocation measurements, the at least one processing device is configured to:
    place the geolocation measurements into different buckets, the geolocation measurements in each bucket associated with a common area of interest and based on signal receipt within a specified time window;
    place the geolocation measurements from the buckets into different groups, each group containing geolocation measurements from the same bucket, the geolocation measurements in each group associated with an approximately equal pulse width and an approximately equal frequency; and
    place the geolocation measurements from the groups into different subgroups, each subgroup containing geolocation measurements from the same group, the geolocation measurements in each subgroup associated with a common pair of receivers and associated with approximately equal time difference of arrival (TDOA) or frequency difference of arrival (FDOA) measurements.

9. The apparatus of claim 8, wherein, to associate the related geolocation measurements, the at least one processing device is further configured to form multiple observation groups, each observation group containing geolocation measurements that might be related to one another.

10. The apparatus of claim 9, wherein, to associate the related geolocation measurements, the at least one processing device is further configured to:
  identify geolocation measurements from the observation groups satisfying one or more criteria; and
  place the identified geolocation measurements into one or more refined observation groups, each refined observation group containing a collection of related geolocation measurements.

11. An apparatus comprising:
  at least one memory configured to store multiple geolocation measurements based on cross-ambiguity function (CAF) detection, the geolocation measurements associated with at least one signal from at least one signal source that is received by multiple receivers; and
  at least one processing device configured to:
    associate related geolocation measurements to form at least one collection of related geolocation measurements, each collection of related geolocation measurements associated with a common one of the at least one signal received by at least some of the receivers; and
    perform geolocation using the at least one collection of related geolocation measurements to identify one or more geolocations of the at least one signal source;

wherein, to associate the related geolocation measurements, the at least one processing device is configured to:
  form multiple observation groups, each observation group containing geolocation measurements that might be related to one another;
  identify geolocation measurements from the observation groups satisfying one or more criteria; and
  place the identified geolocation measurements into one or more refined observation groups, each refined observation group containing a collection of related geolocation measurements; and
wherein the one or more criteria include at least one of:
  a criterion that each collection of related geolocation measurements includes one geolocation measurement from each of multiple distinct pairs of receivers; and
  a criterion that each collection of related geolocation measurements has time difference of arrival (TDOA) or frequency difference of arrival (FDOA) measurements that sum to a value within a threshold amount of zero.

12. An apparatus comprising:
at least one memory configured to store multiple geolocation measurements based on cross-ambiguity function (CAF) detection, the geolocation measurements associated with at least one signal from at least one signal source that is received by multiple receivers; and
at least one processing device configured to:
  associate related geolocation measurements to form at least one collection of related geolocation measurements, each collection of related geolocation measurements associated with a common one of the at least one signal received by at least some of the receivers; and
  perform geolocation using the at least one collection of related geolocation measurements to identify one or more geolocations of the at least one signal source;
wherein, to associate the related geolocation measurements, the at least one processing device is configured to:
  form multiple observation groups, each observation group containing geolocation measurements that might be related to one another;
  identify geolocation measurements from the observation groups satisfying one or more criteria;
  place the identified geolocation measurements into one or more refined observation groups, each refined observation group containing a collection of related geolocation measurements;
  identify geolocation measurements from the observation groups that are associated with prior geolocation measurements previously used to determine at least one prior geolocation; and
  place the identified geolocation measurements into one or more additional refined observation groups.

13. The apparatus of claim 12, wherein, to associate the related geolocation measurements, the at least one processing device is further configured to:
  identify remaining geolocation measurements from the observation groups that do not satisfy the one or more criteria and that are not associated with the prior geolocation measurements; and
  determine whether any of the remaining geolocation measurements are related to one another.

14. The apparatus of claim 12, wherein, to associate the related geolocation measurements, the at least one processing device is further configured to:
  place the geolocation measurements into different buckets, the geolocation measurements in each bucket associated with a common area of interest and based on signal receipt within a specified time window;
  place the geolocation measurements from the buckets into different groups, each group containing geolocation measurements from the same bucket, the geolocation measurements in each group associated with an approximately equal pulse width and an approximately equal frequency; and
  place the geolocation measurements from the groups into different subgroups, each subgroup containing geolocation measurements from the same group, the geolocation measurements in each subgroup associated with a common pair of receivers and associated with approximately equal time difference of arrival (TDOA) or frequency difference of arrival (FDOA) measurements.

15. A non-transitory computer readable medium containing instructions that when executed cause at least one processor to:
  obtain multiple geolocation measurements based on cross-ambiguity function (CAF) detection, the geolocation measurements associated with at least one signal from at least one signal source that is received by multiple receivers;
  associate related geolocation measurements to form at least one collection of related geolocation measurements, each collection of related geolocation measurements associated with a common one of the at least one signal received by at least some of the receivers; and
  perform geolocation using the at least one collection of related geolocation measurements to identify one or more geolocations of the at least one signal source;
wherein the instructions that when executed cause the at least one processor to associate the related geolocation measurements comprise instructions that when executed cause the at least one processor to:
  place the geolocation measurements into different buckets, the geolocation measurements in each bucket associated with a common area of interest and based on signal receipt within a specified time window;
  place the geolocation measurements from the buckets into different groups, each group containing geolocation measurements from the same bucket, the geolocation measurements in each group associated with an approximately equal pulse width and an approximately equal frequency; and
  place the geolocation measurements from the groups into different subgroups, each subgroup containing geolocation measurements from the same group, the geolocation measurements in each subgroup associated with a common pair of receivers and associated with approximately equal time difference of arrival (TDOA) or frequency difference of arrival (FDOA) measurements.

16. The non-transitory computer readable medium of claim 15, further containing instructions that when executed cause the at least one processor to at least one of:
  generate a graphical display based on at least one of the one or more geolocations; and
  generate a report containing at least one of the one or more geolocations.

17. The non-transitory computer readable medium of claim 15, wherein the instructions that when executed cause the at least one processor to associate the related geolocation measurements further comprise:
  instructions that when executed cause the at least one processor to form multiple observation groups, each observation group containing geolocation measurements that might be related to one another.

18. The non-transitory computer readable medium of claim 17, wherein the instructions that when executed cause the at least one processor to associate the related geolocation measurements further comprise instructions that when executed cause the at least one processor to:
  identify geolocation measurements from the observation groups satisfying one or more criteria; and
  place the identified geolocation measurements into one or more refined observation groups, each refined observation group containing a collection of related geolocation measurements.

19. The non-transitory computer readable medium of claim 18, wherein the instructions that when executed cause the at least one processor to associate the related geolocation measurements further comprise instructions that when executed cause the at least one processor to:
  identify geolocation measurements from the observation groups that are associated with prior geolocation measurements previously used to determine at least one prior geolocation; and
  place the identified geolocation measurements into one or more additional refined observation groups.

20. The non-transitory computer readable medium of claim 19, wherein the instructions that when executed cause the at least one processor to associate the related geolocation measurements further comprise instructions that when executed cause the at least one processor to:
  identify remaining geolocation measurements from the observation groups that do not satisfy the one or more criteria and that are not associated with the prior geolocation measurements; and
  determine whether any of the remaining geolocation measurements are related to one another.

* * * * *